INVENTOR.
WILLIAM H. KAUTZ
BY Lindenberg + Freilich
ATTORNEYS

May 26, 1970 W. H. KAUTZ 3,514,760

SORTING ARRAY II

Filed Sept. 13, 1967 3 Sheets-Sheet 2

INVENTOR.
WILLIAM H. KAUTZ

BY Lindenberg + Freilich

ATTORNEYS

INVENTOR.
WILLIAM H. KAUTZ
BY Lindenberg + Freilich
ATTORNEYS 3,514,760
SORTING ARRAY II
William H. Kautz, Woodside, Calif., assignor to Stanford Research Institute, Menlo Park, Calif., a corporation of California
Filed Sept. 13, 1967, Ser. No. 667,521
Int. Cl. G06f 7/02, 7/22
U.S. Cl. 340—172.5 12 Claims

ABSTRACT OF THE DISCLOSURE

A logic network useful in digital computers for sorting data words or numbers to arrange them according to their values, which uses an array of many identical cells in a staggered two-dimensional arrangement adapted for realization by integrated semiconductor technology.

BACKGROUND OF THE INVENTION

This invention relates to digital logic circuits which are especially useful in digital computers and other digital data handling apparatus.

Digital data processing equipment often requires sorting circuits for receiving a group of data words and arranging them in the order of their values. For example, general purpose computers frequently require sorting circuits for arranging a number of commands in accordance with their priority, or arranging data words by size to improve the accuracy of a computation. Also, some data processing equipment requires circuits for arranging names alphabetically, by address, or by other indices. Heretofore, such circuits have generally been realized by serial execution of very long programs on a simple circuit, or by high-speed networks of components connected in a complex manner. Inasmuch as the sorting circuits used have generally been of high capacity in order to store a large number of long data words, the complex high-speed designs have resulted in circuits which were expensive to design, fabricate and test. Sorting circuits utilizing simple and repetitive components and connections would enable a concentration of design efforts on a limited number of types of components and connection. If such circuits also were of a design which was conducive to economical manufacture of many types of digital equipment substantially more economical than has been possible heretofore.

SUMMARY OF THE INVENTION

This invention provides a circuit for receiving data words and arranging them in accordance with their values, by utilizing an array having a large number of cells. Most of the cells are identical and connected to each other in an identical manner, and the remaining cells are of a single, simple type connected in the array in a simple manner. The cells are arranged in a staggered two-dimensional structure which is well adapted for fabrication by integrated semiconductor technology. As a result of the fact that the cells are of only two types, it is economical to apply large efforts to their design and interconnections, thereby enabling high efficiency and reliability and high packing densities.

The array of this invention comprises a large number of logic cells arranged in a "brick-wall" or staggered pattern, forming numerous columns of cells. Each whole cell has two halves, or semicell portions, and each semicell can be in either of two binary states, for holding a binary digit. While the whole cells are staggered, the semicells are operationally arranged in rows. In the process of sorting words, each semicell shifts its digit to the next succeeding semicell of the same row.

A major characteristic of each whole cell is that it can switch the outputs of its semicells so that the digit of the upper semicell is delivered to a semicell in the next lower row, while the output of the lower semicell is delivered to a semicell in the next higher row. This ability to switch digits between two rows enables the array to sort the data words according to their values, and to arrange them with the largest data word at the top, the smallest at the bottom, and words of intermediate value arranged inbetween, according to their relative values.

When starting to sort words, each semicell of the array normally delivers its output to a semicell of the same row in the next succeeding column, at each clock pulse. However, each whole cell compares the digits in its upper and lower semicells to determine whether they should be switched. If the digits in the upper and lower semicells are the same, no switching occurs. If the digit in the lower semicell is larger than the digit in the upper one, the cell is semi-permanently switched to a "crossed" state, whereby every pair of digits thereafter entered into the cell from the preceding column is switched between the two rows. If the digit in the upper semicell is larger than that in the lower one, however, the cell is permanently held in a normal or "uncrossed" state, so that succeeding digits in the semicells are transferred to semicells in the same rows.

As a result of the settings of the whole cells in the crossed and uncrossed states, each data word follows a path through the cells of the array which takes it to a level appropriate to its value in comparison with the values of the other data words in the array. The array essentially compares each adjacent pair of data words, digit by digit, starting with the most significant digit and proceeding through every other digit of each word, to provide for rapid sorting of the words.

DESCRIPTION OF THE PREFERRED EMBODIMENTS

Figure 1:
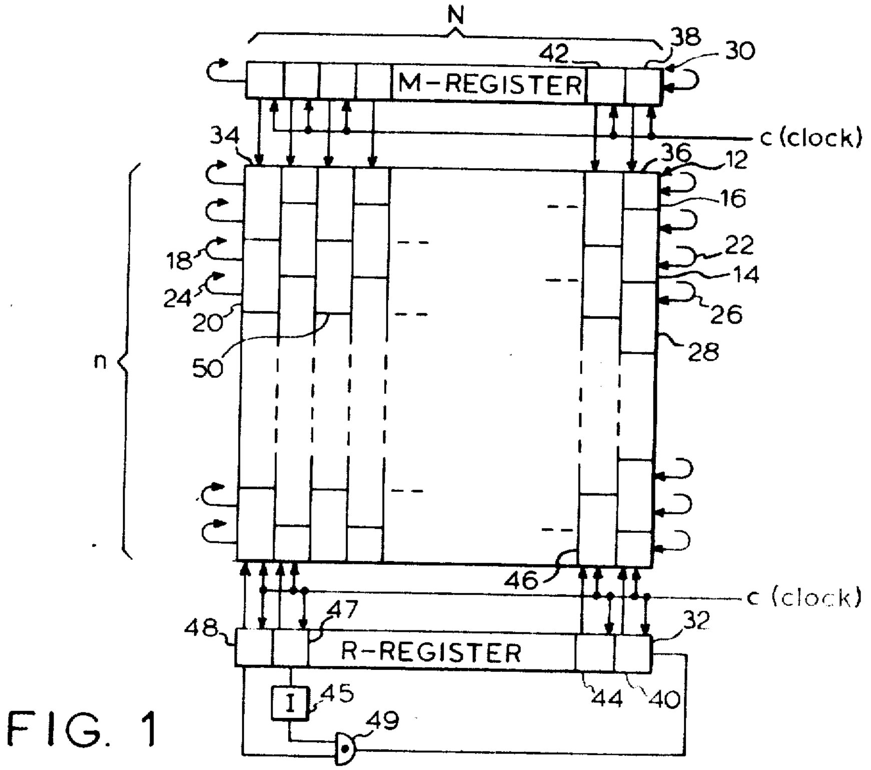
FIG. 1 is a representation of a sorting array constructed in accordance with the present invention.

FIG. 1 illustrates an embodiment of the invention comprising an array 12 including a multiplicity of whole cells, such as whole cell 14, and a plurality of boundary cells, such as boundary cell 16. The whole cells are arranged in a staggered or "brick-wall" pattern, forming operational columns. Each of the whole cells functions as two semicells, with the upper portion serving as one semicell, and the lower portion serving as the other. The semicells form rows, each row of semicells capable of holding a data word or number expressed in binary form, and with each semicell holding one binary digit of the number. Each whole cell is connected only to its immediate left and right neighbors. Corresponding cells at the left and right edges of the array are connected to one another, as though the array were wrapped around a vertical cylinder. For example, an output 18 of cell 20 at the left edge of the array is connected to the input 22 of cell 14 at the right edge of the array, while the output 24 of cell 20 is connected to input 26 of cell 28 at the right edge.

A mask register 30 and reset register 32 are connected to the array 12. The mask register 30 has a plurality of mask cells, each driving one column of cells of the array and connecting to an electric wire or bus which connects to every cell in that column. The mask register cells deliver inputs on the busses which either enable or do not enable each whole cell in the column to perform a switching operation for transferring digits between adjacent rows. The reset register 32 also has a plurality of reset cells for monitoring each column of cells of the array, to terminate the switching of digits between rows of each cell in one of the columns.

An array 12, having a number N of columns normally can hold data words or numbers having a number $N-1$ of digits, inasmuch as one of the columns generally is used solely for terminating comparisons. Each of the digits of a number or data word is entered into one semicell or boundary cell, with an entire row of semicells holding one data word. An array with a number $n$ of rows can be used to sort up to a number $n$ of data words or numbers, of a common length of up to $N-1$ digits.

The array 12 sorts the data words or numbers contained therein by left-shifting all digits at each clock pulse, the digits in the cells situated in the leftmost column 34 being shifted to the cells of the rightmost column 36. After an appropriate number of shifts (equal to the smallest multiple of $n$ which is at least as large as N) each data word is positioned in a row position corresponding to its value, i.e., the value of the number which represents the data word with the largest number at the top. Additional shifts bring the digits back to their original columns, while maintaining their new row positions.

Figure 2:
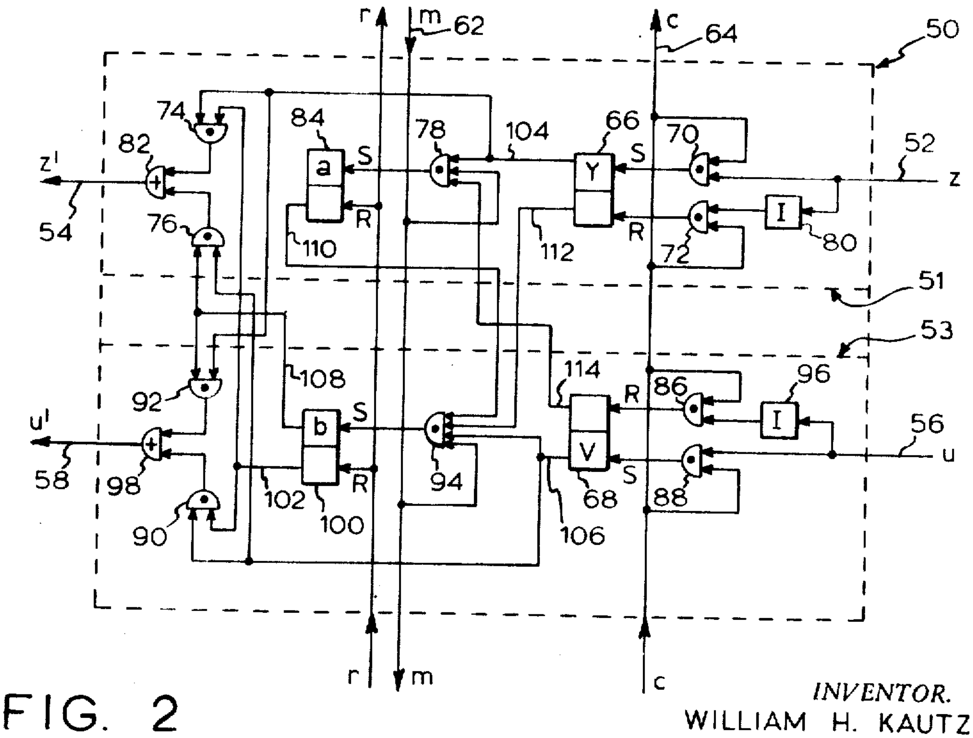
FIG. 2 is a schematic diagram of a whole cell of the array of FIG. 1.

FIG. 2 illustrates one whole cell, such as cell 50 shown in the array 12, this cell being identical to the other whole cells of the array. The cell 50 is operationally arranged as two semicells 51 and 53, comprising its upper and lower halves, respectively. The upper semicell 51 has a row input 52 labeled $z$ and a row output 54 labeled $z'$. The lower semicell 53 has a row input 56 labeled $u$ and a row output 58 labeled $u'$. The cell 50 and each of its semicells have three column inputs which are bussed to all of the other cells in the same column. The bus column inputs comprise a reset input 60 labeled $r$, a mask input 62 labeled $m$ and a clock input 64 labeled $c$.

Each semicell of the cell 50 contains a memory flip-flop for representing a digit value in the semicell, the upper semicell 51 having flip-flop 66 labeled Y and the lower semicell 53 having flip-flop 68 labeled V. Each of the semicells also contains numerous gates. The upper semicell 51 includes AND gates 70, 72, 74, 76 and 78, an INVERTER gate 80, an OR gate 82, and a control flip-flop 84 labeled $a$. The lower semicell 53 contains AND gates 86, 88, 90, 92 and 94, an INVERTER gate 96, an OR gate 98, and a control flip-flop 100 labeled $b$. The upper and lower semicells 51 and 53 are similar except for the AND gates 78 and 94, the functions of the control flip-flops 84 and 100, and the connections to these elements.

A first function of each semicell is to place its memory flip-flop in the state defined by a binary signal on its row input $z$ or $u$ at the time a clock signal is received on its $c$ input. Upper semicell 51 has its row input $z$ connected directly to an input of AND gate 70 and connected through INVERTER 80 to AND gate 72. Each of the AND gates 70 and 72 also has an input received from clock bus $c$. If, at clock time, the signal on $z$ is one, it passes through AND gate 70 to the set input S of the Y flip-flop to set it and establish the state of the semicell as a one. If, on the other hand, $z$ carries a zero, INVERTER gate 80 delivers a one which passes through AND gate 72 to the reset input R of the Y flip-flop 66 to reset it and establish the state of the upper semicell as a zero. In a similar fashion, row input signals at $u$ on the lower semicell 53 set the V flip-flop to establish a one state if $u$ is a one at clock time, and reset flip-flop V to establish a zero state if $u$ is a zero.

The rest of the cell 50 which receives outputs from the memory flip-flops Y and V, is used primarily to determine whether the output the of the memory flip-flop of each semicell is to be delivered to the row output of that same semicell or is to be delivered to the row output of the other semicell. For example, the output of memory flip-flop Y of the upper semicell 51 is normally delivered at the $z'$ row output, while the output of memory flip-flop V of the lower semicell 53 is normally delivered to the $u'$ row output. However, if the cell is in a crossed state, the output of flip-flop Y is delivered to the $u'$ row output while the output of the V flip-flop is delivered to the $z'$ row output.

The state of the $b$ control flip-flop 100 determines whether the state of each whole cell is uncrossed so that the row output of each semicell is equal to the state of its memory flip-flop, or is crossed so that the row output of each semicell is equal to the state of the memory flip-flop of the other semicell of the same whole cell. When the whole cell 50 is in an uncrossed state, the $b$ control flip-flop is in a reset state, and its reset output 102 delivers a one signal to AND gates 74 and 90. The set output 104 of the Y memory flip-flop then passes through AND gate 74 and OR gate 82 to the $z'$ row output 54. At the same time, the reset output 102 of the $b$ control flip-flop opens AND gate 90 to allow the set output 106 of the V memory flip-flop to pass through AND gate 90 and OR gate 98 to the $u'$ row output 58 of the lower semicell. The other inputs to OR gates 82 and 98 are held in a zero state, since one of the inputs of each of the AND gates 76 and 92, respectively, is supplied by the set output 108 of the $b$ control flip-flop, this set output assumed to carry the value zero.

When the whole cell 50 is in a crossed state, the $b$ control flip-flop 100 is in a set state, and a one on its set output 108 is delivered to AND gates 76 and 92 to open them. Then, the set output 104 of the Y memory flip-flop 66 passes through AND gate 92 and OR gate 98 to the $u'$ row output 58 while the set output 106 of the V memory flip-flop passes through AND gate 76 and OR gate 82 to the $z'$ row output 54. Thus, if the $b$ control flip-flop is set, the digit of the upper semicell 51 is delivered on the row output $u'$ of the lower semicell 53 while the digit of the lower semicell is delivered on the row output $z'$ of the upper semicell, thereby causing a corssing of outputs between the semicells. At the same time, the other inputs to OR gates 82 and 98 are held at zero, since the input 102 from $b$ control flip-flop 100 is assumed to have the value zero, and this input blocks AND gates 74 and 90, respectively.

Normally, the $b$ control flip-flop is initially in a reset state so that the cell 50 is in an uncrossed state. If the mask input bus 62 carries a one signal, then the cell 50 compares the state, or digit, held by the upper and lower semicells (in the Y and V flip-flops) to determine whether they are the same or one is larger than the other. If the Y digit is larger than the V digit (i.e., $Y=1$ while $V=0$) then the cell 50 is semipermanently locked into an uncrossed state, so that the row outputs $z'$ and $u'$ of each semicell is equal to the state of its memory flip-flop Y and V, respectively: i.e., $z'=Y$, $u'=V$. If the digit in the lower memory flip-flop V is larger than the digit in the upper memory flip-flop Y (i.e., $Y=0$ while $V=1$) then the cell 50 is semipermanently locked in a crossed state so that the state of each semicell is delivered to the row output of the other semicell: i.e., $z'=V$ and $u'=Y$. If the digits in the upper and lower cells are equal (i.e., $Y=V=1$ or $Y=V=0$) then the cell 50 remains in an uncrossed state, but it is not locked into this state and may be locked into either a crossed or uncrossed state when it later compares two other digits in its two semicells.

The locking of cell 50 into either a crossed or uncrossed switching state occurs only if a one signal is received over mask input bus 62, at the time an inequality exists between the states of the upper and lower semicells. First the operations involved in locking the cell into a crossed state, wherein the $b$ flip-flop is changed to a set state, will be considered. The *b* flip-flop, which is initially in a reset state, can be changed to a set state only if it receives a signal on its set input from AND gate 94. The AND gate 94 has four inputs. One input is connected to the *m* bus 62 which is assumed to be delivering a one, and another input is connected to the reset output 110 of the *a* control flip-flop 84 which initially is in a reset state and therefore delivers a one to the AND gate 94. The other two inputs of AND gate 94 are received from the V and Y flip-flops. If the lower semicell carries a larger digit than the upper semicell, so that $V=1$ while $Y=0$, then the set output 106 of the V memory delivers a one to AND gate 94 while the reset output 112 of the Y memory also delivers a one to AND gate 94. AND gate 94 therefore has a one on all four of its inputs and it delivers a one to the set input S of the *b* control flip-flop. The *b* flip-flop thereafter delivers a one output (on its output 108) only to AND gates 76 and 92. Accordingly, the outputs of the Y and V memories are crossed to the row outputs of the other semicells, and the cell 50 is in a crossed state.

Once the *b* flip-flop is set, thereby placing the cell 50 in a crossed state, the *b* flip-flop cannot be reset except by a signal over reset input 60, labeled *r*, which normally occurs only at the end of relatively long intervals, and, therefore, the cell remains semi-permanently crossed. Thereafter all upper row input signals at *z* pass, at successive clock times, one of the cell 50 at the lower row output *u'*, while the lower row input signals at *u* pass out of the cell at upper row output *z'*.

The operations involved in semi-permanently locking the whole cell in an uncrossed state will now be considered. If, before the cell 50 is locked in a crossed state, the upper semicell 51 carries a larger digit than the lower semicell 53, then the cell 50 is locked into an uncrossed state. When such an equality occurs, wherein $Y=1$ and $V=0$, the AND gate 78 receives a one from set output 104 of the Y flip-flop, a one from the reset output 114 of V flip-flop, and (assuming $m=1$) a one from the *m* bus 62. As a result, AND gate 78 delivers a one to the set input of the *a* control flip-flop 84 to set it. The *a* flip-flop thereafter delivers a zero on its reset output 110 which leads to AND gate 94. Accordingly, AND gate 94 thereafter remains closed, and the *b* control flip-flop cannot be set regardless of any later occurrences of an inequality wherein the lower semicell contains a larger digit than the upper semicell. The cell 50 thereafter remains locked in an uncrossed state wherein the row input at *z* or *u* is delivered, at each clock pulse, to the row output *z'* and *u'* of the same semicell. This condition of cell 50 must remain until a one input is received over *r* reset bus 60, which occurs only at the end of relatively long intervals.

Figure 3:
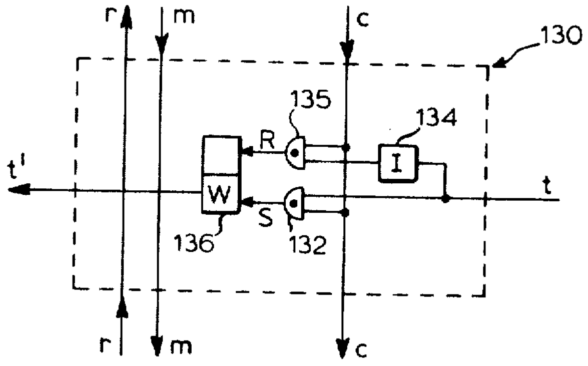
FIG. 3 is a schematic diagram of a boundary cell of the array of FIG. 1.

While most of the cells of the array 12 are of the type shown in FIG. 2, every other cell along the extreme top row and bottom row of semicells is a boundary cell of the type shown in FIG. 3. Essentially, this cell behaves as one stage of a conventional shift register, with advance clock *c*. The boundary cell 130 shown in FIG. 3 functions as a semicell having a row input *t*, a row output *t'*, and a clock bus input *c*. Mask and reset busses *m* and *r* pass through the boundary cell 130 but do not connect to any circuitry therein. The function of boundary cell 130 is to receive a binary signal over its row input *t*, and, only at clock time when it receives a pulse on clock bus *c*, to deliver that row input to its row output *t'*. The *t'* output after clock time is equal to the *t* input received just prior to clock time. The boundary cell 130 functions by delivering its *t* input to AND gate 132, and through INVERTER gate 134 to AND gate 136. The AND gates 132 and 135 connect to the set and reset inputs, respectively, of W memory flip-flop 136. At clock time, when a pulse is received over clock bus *c*, the W flip-flop is set or reset, and the *t'* row output is redefined.

The operatoin of the whole cell 50 can be defined by the following logic equations which relate its inputs and outputs and its states:

$$z'=\bar{b}Y+bV$$
$$u'=\bar{b}V+bY$$
$$s_a=Y\bar{V}m$$
$$s_b=\bar{Y}V\bar{a}m$$
$$r_a=r_b=r$$
$$s_y=cz$$
$$r_y=c\bar{z}$$
$$s_v=cu$$
$$r_v=c\bar{u}$$

where *z* is a first semicell row input, *u* is a second semicell row input, *z'* is the row output of the first semicell, *u'* is the row output of the second semicell, *m* is the mask input to the first and second semicells, *c* is a clock input occurring at a clock time, Y represents a digit held by the first semicell, V represents the digit held by the second semicell, $s_a$ is the set input to the *a* flip-flop and represents the establishment of the whole cell in a locked uncrossed state wherein $\bar{b}$ obtains, $s_b$ is the set input to the *b* flip-flop and represents the establishment of the whole cell in a locked uncrossed state wherein *b* obtains, $s_y$ is the set input to the Y memory, $r_y$ is the reset input to the Y memory, $s_v$ is the set input to the V memory, and $r_v$ is the reset input to the V memory. The inputs $s_y$, $r_y$, $s_v$ and $r_v$ are generated only at clock time, while all of the other signals are maintained in between clock times.

The operation of the boundary cell 130 can be defined by the following logic equations:

$$t'=W,\ s_w=ct,\ \text{and}\ r_w=\overline{ct}$$

where *t* is the input to the cell, *t'* is the output, and $s_w$ and $r_w$ represent the set and reset inputs to the cell memory, respectively; the inputs $s_w$ and $r_w$ are generated only at clock time, while all of the other signals are maintained inbetween clock time.

The array 12, shown in FIG. 1, may be utilized by first entering a data word in each row of semicells in a manner to be described. Each semicell of a row can hold one binary digit of the data word or number, except for one semicell, such as the one in the rightmost column 36. This semicell stores a zero or "spacer" which is used later for resetting the control flip-flops at the end of each word, as will be explained below. Each data word, or number, can be entered initially into any one of the number *n* of rows of semicells, regardless of its value as compared to the other numbers to be entered. After circulating operations, also to be described, each of the numbers will be arranged in a row of semicells appropriate to its value, so that all larger numbers are contained in the rows above it and all smaller numbers are contained in the rows below it.

In a typical operation of the mask, or M register 30, each cell of the M register except the rightmost cell 38 is established in a "one" state, so that it delivers a one on its mask output. Accordingly, a one is delivered on the mask bus *m* to every cell of the array in a column driven by an M register cell containing a one—that is, to every cell except those in the last column 36. The rightmost cell 38 contains a zero, so that the *m* bus of the column it drives carries a zero signal. The R register 32 has cells, and, in a typical operation, each of the R register cells is initially in a one state. As a result, each of the reset column busses *r* carries a one to all of the cells in its column, thereby inhibiting comparison in these columns initially.

To begin the sorting process, after numbers have been entered into the rows of the array, a clock pulse is delivered over every clock bus *c*. The clock busses also connect to cells of both the M and R registers, so that every cell of the array 12 and of both registers 30 and 32 receives a clock pulse at the same time. Thus, the entire array and both the M and R registers shift left one digit position on application of the clock. The contents of the cells in the leftmost column 34 of the array are shifted around to the cells in the rightmost column. Since every $r$-bus carries a one, all cells remain in the uncrossed state, and no vertical motion of the data stored in the array takes place. The leftmost two stages 47 and 48 of the R-register 32 both provide one input, the output of stage 47 passing through INVERTER 45 to AND gate 49 and the output of stage 48 passing directly to AND gate 49. The AND gate 49 generates a zero at its output, and the rightmost stage 40 of the R-register 32 contains a zero after the first clock has been applied.

After receipt of the first clock pulse, but prior to the receipt of the second clock pulse, each of the whole cells of the array in the rightmost column 34, wherein $r=0$, compares the digits in its upper and lower semicell portions. If the pair of digits in any whole cell in this column are the same, the whole cell is unaffected. If the digits are different, the whole cell is latched to a crossed or uncrossed state, in the manner described above. When the second clock pulse is delivered to all cells, the contents of each semicell in the array are shifted to a semicell in the left adjacent column; the uncrossed cells shift their states directly to the left, while the crossed semicells in the rightmost column 36 shift their states to a semicell in the left adjacent column, each into the row immediately above or below. Simultaneously, the state of each cell of the M register 30 is left-shifted by one cell, so that all M register cells except the third from rightmost cell contains ones. Similarly, the states of all of the cells of the R register 32 are left-shifted by one digit. The INHIBIT gate 49 again generates a zero output, so that all of the R cells are in a one state, except the rightmost cell 40 and the second from rightmost cell 44, both of which contain zeros.

After the second clock pulse, therefore, a new digit is entered in each semicell, and each whole cell contains a new set of digits. Those whole cells in the rightmost two columns which have not already been latched into either a crossed or uncrossed state (and which are in a column where $m=1$) now make a new comparison between the digits in their upper and lower semicells, and if the digits are different the whole cell is latched into either a crossed or uncrossed state. Upon the receipt of the next clock pulse to every cell of the array and of the two registers, the states or digits of the semicells are again shifted to the left adjacent column; the shift is to a semicell of the same row for those whole cells which are not in a crossed state and to the next higher or lower row for those whole cells which are in a crossed state. The boundary cells, which constitute alternate cells of the top and bottom rows, merely leftshift the digits they hold, at every clock pulse, without changing rows.

After N clock pulses have been applied, the most significant digit position of the data words stored in the array will again fall in the leftmost column, and the R-register will contain all zeros except in the rightmost stage 40. As a result, the set of all the cells in the rightmost column 36 will be unlatched (and in an uncrossed state) because of the signal $r=1$ applied to its $r$-bus. As additional clock pulses are applied, this single one will remain in the R register, shifting with the array so as to unlatch just that column of cells at the end of the stored data words.

As a result of the shifts, each of the numbers in adjacent rows is compared, digit by digit, starting with the most significant digits. Successive interchanges occur which allow words to gradually float upward or sink downward in the array, depending upon their relative sizes. The connections around the array from the output of a leftmost column to the input of the rightmost column, and the use of a continual reset at the end of the words (because of one reset line $r$ carrying a 1), permits the circulation to be continued until all words of the memory are sorted by size.

The sorting is done with respect to those columns of digits over which the mask register cells M contain a one. If it is desired to sort with respect to only selected digit positions of the data words, this can be done by initially setting the M register cells at one for these positions, and at zero for all other positions. In this way, the comparison operation is inhibited except over the set of selected digit positions (sometimes called the "key" of the word).

The number of digit shifts which are required for complete sorting is, in general, exactly equal to the number of words being sorted, which is a maximum of $n$, plus the number of digits in each word, which equals N. The number of digit shifts required to sort all $n$ words and also leave these words in the memory in their original digit-phase—that is, with the most significant digits in the leftmost column, is N more than the smallest multiple of N which is at least as large as $n$. It may be noted that N is equal to one or two more than the length of the data words, whichever of these values is even.

A better understanding of the operation of the array may be obtained by considering an example, illustrated by FIGS. 4A through 4I, of the sorting of four numbers by an array having four rows and four columns. Each of the four numbers, which have decimal values of one, six, four and three are represented by three binary digits: Row 150 holds the number "001" representing the decimal number 1, row 152 holds the binary number "110" representing the decimal number 6, row 154 holds the binary number "100" representing the decimal number 4, and row 156 holds the binary number "011" representing the decimal 3. The first three columns 158, 160 and 162 have a mask input of $m=1$ and a reset input of $r=1$, while in the last column 164, $m=0$ and $r=1$. By virtue of the $m=1$ inputs, each of the whole cells (designated by boxes around two semicells) in three of the four columns can compare the two digits in its semicells.

Figure 4A:
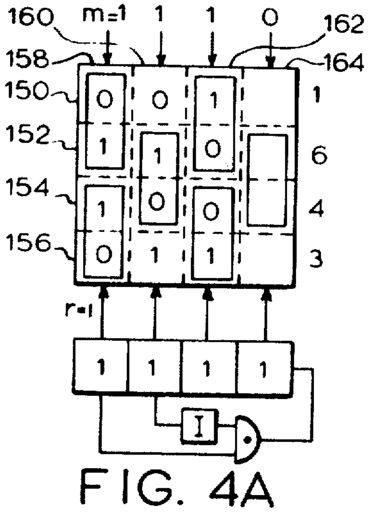
FIGS. 4A through 4I are representations of a simplified array, showing the digits and switching states immediately prior to each clock pulse, in the case of a sorting of four numbers in binary form.
Figure 4B:
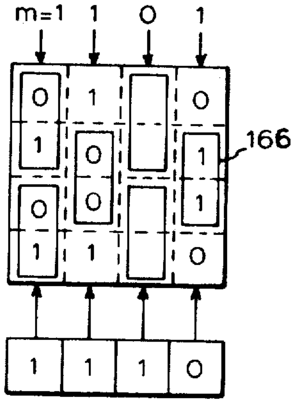
Figure 4C:
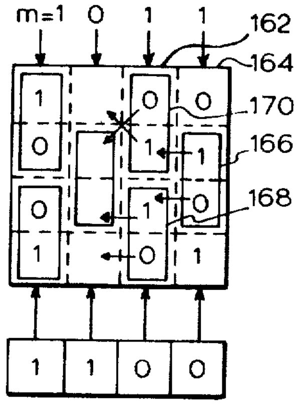

In the particular example of four numbers shown in FIG. 4A, application of the first clock pulse merely shifts all four words one digit to the left, yielding the pattern of stored digits shown in FIG. 4B, since all four r-busses carry a one signal, prior to the first clock pulse, thereby inhibiting all comparisons. After the first clock pulse, resulting in the state shown in FIG. 4B, comparisons are enabled in the right-most column 164 (because $r=0$ and $m=1$); however, the two digits in the whole cell 166 results in no latching into either the crossed or uncrossed state. Therefore, after the second clock pulse, the array has the pattern shown in FIG. 4C. Now, the two rightmost columns 162 and 164 are enabled for comparison. In this case, the two digits in each whole cell in these columns 162 and 164 are different, and therefore each whole cell is latched into a crossed or uncrossed state. The crossed state of a whole cell is represented by the crossed arrows at the left edge of a whole cell, while the uncrossed state is represented by two horizontal arrows at the left edge of a whole cell. It may be seen that whole cells 166 and 168 are latched in the uncrossed state, and whole cell 170 is latched in the crossed state.

Figure 4D:
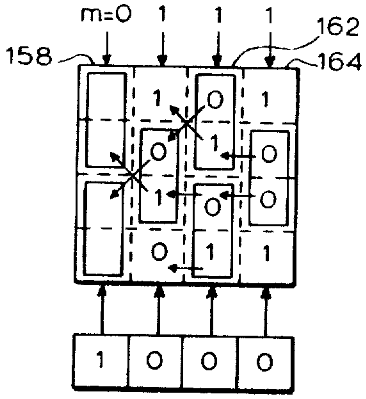

FIG. 4D represents the states of all of the semicells after the third clock pulse has been applied to them, and the digits have again been shifted to the next column. The whole cells in the columns 162 and 164 retain their states of latched crossed and latched uncrossed, while the whole cell in column 160 now makes a new comparison which causes it to be latched in a crossed state. Comparisons are still inhibited in column 158, since $r=1$ in this column.

Figure 4E:
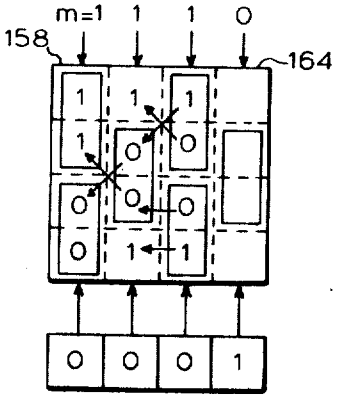

Application of the fourth clock pulse shifts the data to the left again, resulting in the pattern of states shown in FIG. 4E. It may be noted that the single digit $r=1$ which is shifting in the R-register now resets the whole cells in column 164 to an unlatched state. Column 158 now makes a comparison of the set of digits in its two whole cells. Inasmuch as the two digits are the same in each whole cell, the whole cells in column 158 are not yet latched, and are neither uncrossed nor crossed.

Figure 4F:
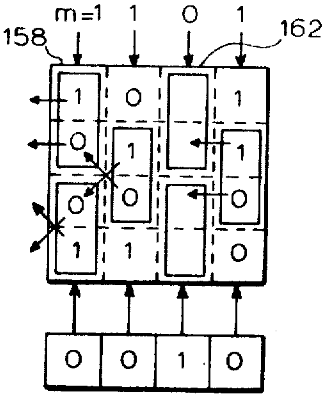

After the occurrence of the next clock pulse, the array has the states shown in FIG. 4F. It may be noted that the digits shifted into column 158 provide each whole cell thereof with dissimilar digits, causing latching of those whole cells. Thus, while the cells of column 158 were not latched after the previous clock pulse, they are now latched. It may be noted also that column 162 is reset and ready to start a new sequence of comparisons.

Figure 4G:
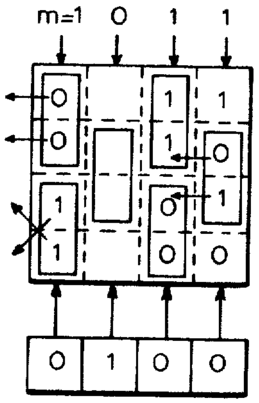
Figure 4H:
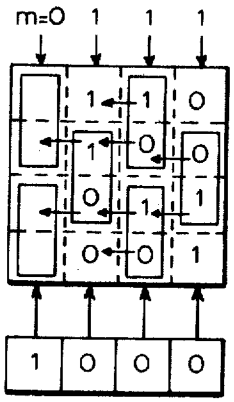
Figure 4I:
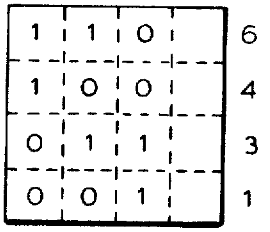

The next three clock pulses change the states to those shown in FIGS. 4G, 4H and 4I in succession. As can be seen, the four original numbers have now been arranged according to value with the largest number (the decimal six represented by the binary "110") in the top row and the smallest number (the decimal one which is represented by the binary "001") in the bottom row.

Data words may be written in and read out from the array most easily by using a serial mode for each row, by employing the left-side-to-right-side connections, such as left edge output 18 and 24 and right side inputs 22 and 26, shown in FIG. 1. One manner of doing this is to place a zero in each M register cell so that no crossing occurs, and to then deliver the digits of the new data word to the rightmost column inputs at each clock pulse (which is supplied to all cells of the array). If it is desired to read in a new word to only one row, all other rows can be connected in a normal manner with the left column outputs connected around to the right column inputs. Similarly, any selected row can be read out by receiving the outputs from the left column of that row.

In some applications, it may be desirable to read out all numbers from the topmost row and read in all numbers to the bottommost row. So long as at least one row of the array is not filled with a data word, the read in of new words in a bottom row assures that no data word already in the array is lost. Of course, if the largest data word is to be obtained from the topmost row, the array must be circulated in a manner earlier described so as to allow the largest word to float to the top row.

Another manner of serial read in and read out involves the reservation of the most significant digit position in each row as a tag to indicate whether the content of that row is or is not a valid word. The most significant digit of a valid word, which is its tag, is always equal to one, while the most significant digit of each row wherein a word has been "removed" is made equal to zero. Accordingly, during sorting, the valid words float to the top and the rows containing invalid words (or which are empty) drift to the bottom of the array. By sampling the most significant digits of the top and bottom rows of the array, the full, partially full, and empty statuses of the array may be readily monitored. Words to be read out may then be taken from the top row until a zero tag digit is encountered in the upper leftmost cell output, and new words can be readily entered into the bottom row until a one tag digit is encountered in the bottom leftmost cell output.

Parallel write in and read out may be employed by adding word addressing and bit parallel access circuitry. Another manner is to provide additional inputs at the *u* row inputs of each semicell at the bottom row of the array (or additional *t* inputs in the case of the boundary cells). Then, a complete data word may be entered in parallel into the bottom row in a single clock time and moved into a higher row with a single word shift of the array. Unless the memory is full, the bottom row will then contain all zeros and be ready for the next word to be entered into the array. For read out following sorting, the largest word in the memory may be taken directly from the top row by connecting array outputs to each of the *z'* row outputs of each semicell of the top row (or the *t'* output in the case of the boundary cells).

Figure 5:
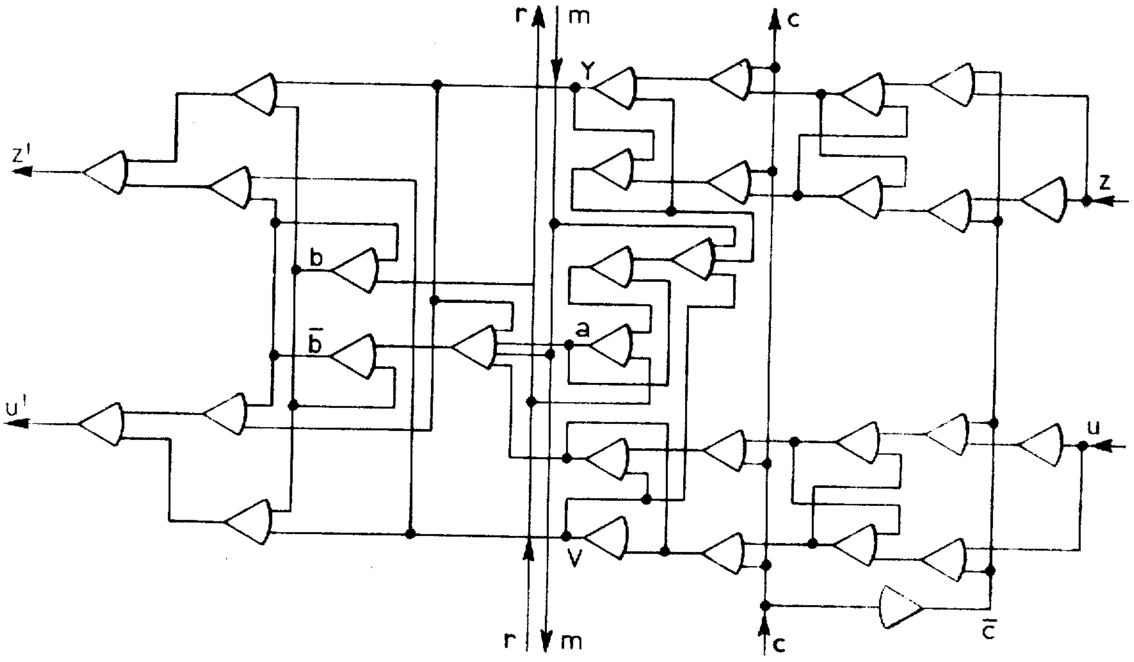
FIG. 5 is a schematic diagram of a NOR gate realization of one cell of the array of FIG. 1.

FIG. 5 illustrates a NOR gate realization of one cell of the array of FIG. 1. The cell of FIG. 5 uses two static flip-flops instead of each dynamic flip-flop, as assumed in FIG. 1. Two phases, *c* and $\bar{c}$, of the clock are now needed for establishing the Y and V states of the semicells. The input and output equations of the cell of FIG. 5 are the same as for the cell of FIG. 2.

The arrays of cells described herein are particularly well adapted to realization by large-chip integrated circuit techniques, for a number of reasons: first, the array has a small number of external leads in comparison with the amount of storage and logic capability within the array. Second, the iterative (repetitive) layout, which utilizes only two types of cells, greatly facilitates fabrication and testing and enables the design effort to be concentrated on only two cell designs; one of these is a conventional register stage, and may be regarded as a simplification of the other. Third, all of the internal gating enjoys the advantage of small fan-in and fan-out (i.e., few inputs and outputs from each gate) and short wire lengths, so that the ultra-high-speed capabilities of integrated circuitry may be fully realized. (It should be noted that the *r*, *m* and *c* busses are not internal lines, but are externally driven.)

While particular embodiments of the invention have been illustrated and described, it should be understood that many modifications and variations may be resorted to by those skilled in the art, and the scope of the invention is limited only by a just interpretation of the following claims.

I claim:

1. A sorting array comprising:

a matrix of cell means each constructed to store a digit, said cell means arranged in rows, so that each row can hold digits representing a multi-digit word;

means for comparing the digits in each pair of a plurality of pairs of cells and, in the case where said digits are of different values, establishing paths for said digits and for less significant digits of the same words to follow regardless of the relative values of said less significant digits, said paths coupling each cell of the pair to one of two other cells chosen in accordance with the relative inequality of the digits in said pair of cells; and means for advancing said digits along said paths.

2. The sorting array described in claim 1 wherein: the cells on opposite sides of the array are connected together to enable a word to repeatedly circulate through the array.

3. The sorting array described in claim 1 wherein:

said cell means are arranged in columns and rows;

said array is arranged to form a plurality of whole cells, each whole cell including a pair of cell means in the same column and adjacent rows and means for comparing the digits in said pair of cell means, said whole cells arranged in a staggered pattern, each having upper and lower inputs coupled to two other whole cells and upper and lower outputs coupled to two different whole cells, said upper inputs and outputs coupled to cell means of the same row and said lower inputs and outputs coupled to cell means of the same row; and said means for comparing in each of said whole cells is constructed to advance a digit received on its upper input to its upper output if that digit is larger than the digit received on its lower input, and is constructed to advance the digit received on its upper input to its lower output if the digit received on its upper input is smaller than the digit received on its lower input.

4. A sorting array comprising:

a multiplicity of whole cells operationally arranged in columns and staggered rows, each whole cell having first and second semicells in the same column but different rows;

each of said semicells including a semicell input for receiving a signal representing a digit value, a semicell output for delivering a signal representing a digit value, and memory means for delivering, after a clock time, a signal output representative of a digit represented on said input prior to said clock time;

each of said whole cells including connecting means connected to said semicell outputs of said first and second semicells, for establishing said whole cell in a latched crossed state wherein the output of each memory means of each semicell is connected to the semicell output of the other semicell, and for establishing a latched uncrossed state wherein the output of each memory means is connected to the output of its own semicell;

said connecting means including switching means responsive to the outputs of the memory means of said first and second semicells for establishing said latched crossed state when the digit value of the memory means of said first semicell is smaller than the digit value of the memory means of said second semicell and for establishing said latched uncrossed state when the digit value output of said memory means of said first semicell is greater than the digit value of the memory means of said second semicell; and conductor means connecting the output of each semicell to the input of another semicell of the same row and in another operationally adjacent column.

5. A sorting array as defined in claim 4 wherein:

said array includes an upper row of semicells and a lower row of semicells; and including boundary cells positioned in said upper row and lower row in alternate columns, each of the boundary cells located along said top row having an input and an output connected to the first semicells of whole cells in adjacent columns and each cell in said lower row having an input and an output connected to the second semicell of whole cells in adjacent columns, each of said boundary semicells including means for delivering, after a clock time, a signal on its output representing a digit represented on its input prior to said clock time.

6. A sorting array as defined in claim 4 including: connecting means connecting the output of the semicells of a column located at a first edge of said array to the semicell inputs of the column of cells at the opposite edge of said array, whereby to enable circulation of digits repeatedly through said array.

7. A sorting array as defined in claim 4 including:

a plurality of reset column means, each connecting to the whole cells of each column; and reset register means connecting to said reset column busses, for providing a first reset input to at least one of said reset column busses and a second reset input to all of the other column busses, including means for shifting said first reset input from each column bus to another column bus at clock time;

each of said connecting means including reset means responsive to signals on said reset column bus for unlatching said whole cell from said latched crossed and said latched uncrossed states.

8. A sorting array as defined in claim 4 including:

a plurality of mask column busses, each connecting to the whole cells in each of said columns;

mask register means connecting to said plurality of mask column busses, for delivering a first signal on a first plurality of said mask column busses and for delivering a second signal on a second plurality of said column busses, including means for shifting said first and second signals by one column at clock time; and wherein each of said connecting means includes mask input means responsive to signals on said mask column bus, for selectively enabling and inhibiting latching in said crossed and uncrossed states.

9. A sorting array as defined in claim 4 wherein:

the outputs of said whole cells are defined by the equations:

$$z'=\bar{b}Y+bV,\ u'=\bar{b}V+bY,\ s_y=cz,$$
$$r_y=c\bar{z},\ sv=cu,\ r_v=c\bar{u}$$

where $z$ and $z'$ represent the input and output of said first semicell prior to a clock time, $u$ and $u'$ represent the input and output of said second semicell prior to said clock time, Y and V represent the states of said memory means of said first and second semicells prior to said clock time, $b$ and $\bar{b}$ represent the crossed and uncrossed states of said whole cell prior to said clock time, $s_y$ and $s_v$ represent signals establishing a first digit in said Y and V memories at a clock time, $r_y$ and $r_v$ represent signals establishing a second digit in said Y and V memories at said clock time, and $c$ represents a signal occurring at clock time.

10. A sorting array comprising:

a multiplicity of interconnected semicell means operationally arranged in columns and rows, each of said semicell means including state-defining means defining a state of said semicell and having a state-defining means output, a semicell output, and a semicell input; and interchange means responsive to inequalities of the states of said state-defining means of a pair of adjacent semicells in the same column and connecting said outputs of said state defining means to the semicell outputs of said pair of semicells, for latching in a crossed state when a first inequality is detected and for latching in an uncrossed state when a second inequality is detected, wherein in said crossed state the output of the state defining means of each semicell is connected to the semicell output of the other semicell of the pair and wherein in said uncrossed state the state-defining means output of each semicell is connected to the semicell output of the same semicell of the pair.

11. A sorting array as defined in claim 10 wherein:

each of said interchange means includes a reset input for receiving reset signals and means responsive to signals on said reset input for unlatching said interchange means to allow it to thereafter relatch;

bus means connected to the rest inputs of all of said interchange means in a column; and register means connected to said bus means of each of said columns for providing a reset signal to at least one of said reset busses, said register means including means for shifting said reset signal to succeeding columns.

12. A sorting array as defined in claim 10, wherein each pair of semicells to which an interchange means is connected comprises:

a first row input connected to a first of said semicells;

a second row input connected to a second of set semicells;

a first row output connected to said first semicell;

a second row output connected to said second row output;

a first memory flip-flop located in said first semicell;

a second memory flip-flop located in said second semicell;

clock means connected to said first and second semicells;

first logic means having inputs connected to said first row input and said clock means and an output connected to said first memory flip-flop for setting and resetting said memory flip-flop in accordance with a binary signal received on said first row input at the time a clock pulse is received on said clock input;

second logic means having inputs connected to said second row input and said clock input and outputs connected to said second memory for setting and resetting said second memory flip-flop in accordance with a binary signal received on said second row input at the time a pulse is received on said clock input;

a first control flip-flop;

a first output logic means having inputs connected to said first and second memory flip-flop and to said first control flip-flop for selectively delivering signals from said first and second flip-flops to said first and second row outputs, respectively and to said second and first row outputs, respectively, in accordance with the state of said first control flip-flop;

switching logic means having first inputs connected to said first and second memory means and having a reset input and having an output connected to said first control flip-flop for establishing said first control flip-flop in said first and second states in accordance with the relative values of digits stored in said first and second memory flip-flops; and reset bus means connecting to said first control flip-flop for unlatching it.

References Cited

UNITED STATES PATENTS

| | | | |
|---|---|---|---|
| 3,329,938 | 7/1967 | Armstrong | 340—172.5 |
| 3,329,939 | 7/1967 | Armstrong | 340—172.5 |

GARETH D. SHAW, Primary Examiner